Jan. 1, 1952  W. H. STEWART  2,581,215
OUTSIDE METAL BLIND

Filed March 25, 1949  3 Sheets-Sheet 1

INVENTOR.
William H. Stewart
BY Lancaster, Allwine and Rommel
ATTORNEYS.

Jan. 1, 1952 W. H. STEWART 2,581,215
OUTSIDE METAL BLIND
Filed March 25, 1949 3 Sheets-Sheet 2
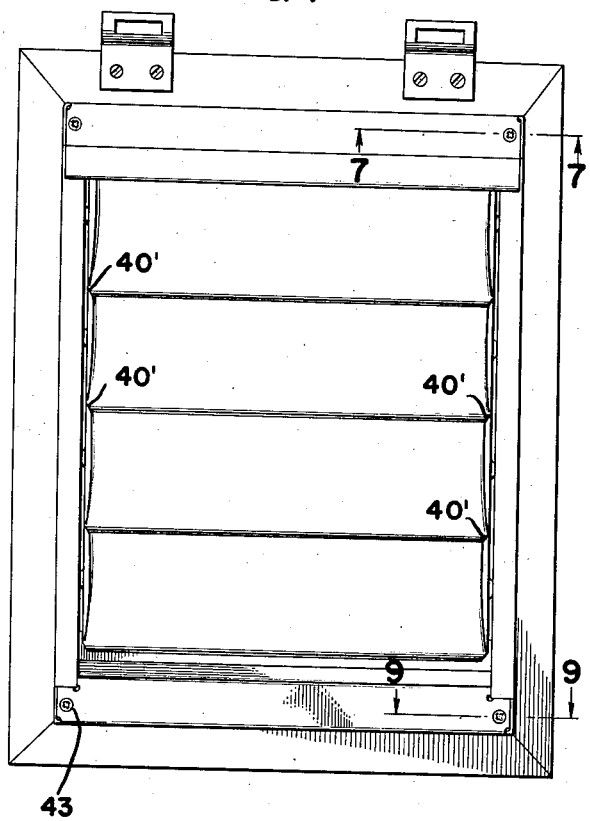
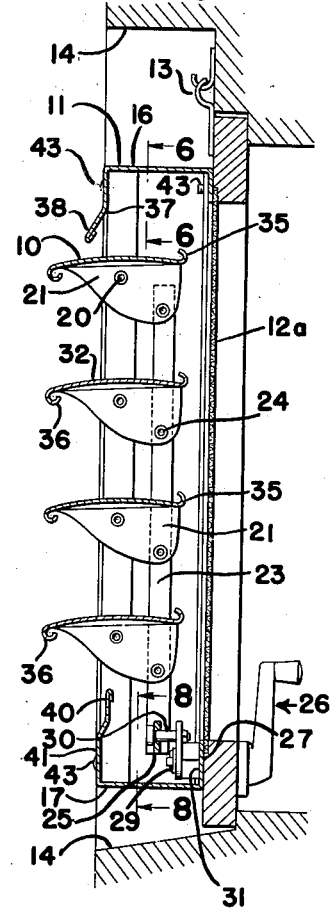
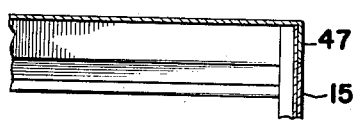
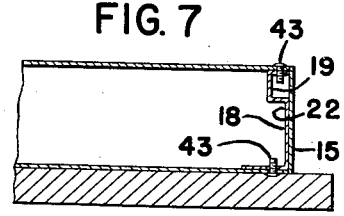
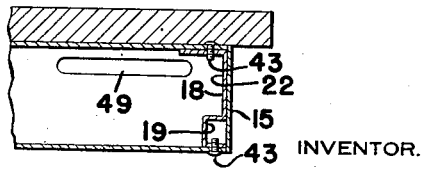
INVENTOR.
William H. Stewart
BY *Lancaster, Allwine Rommel*
ATTORNEYS.

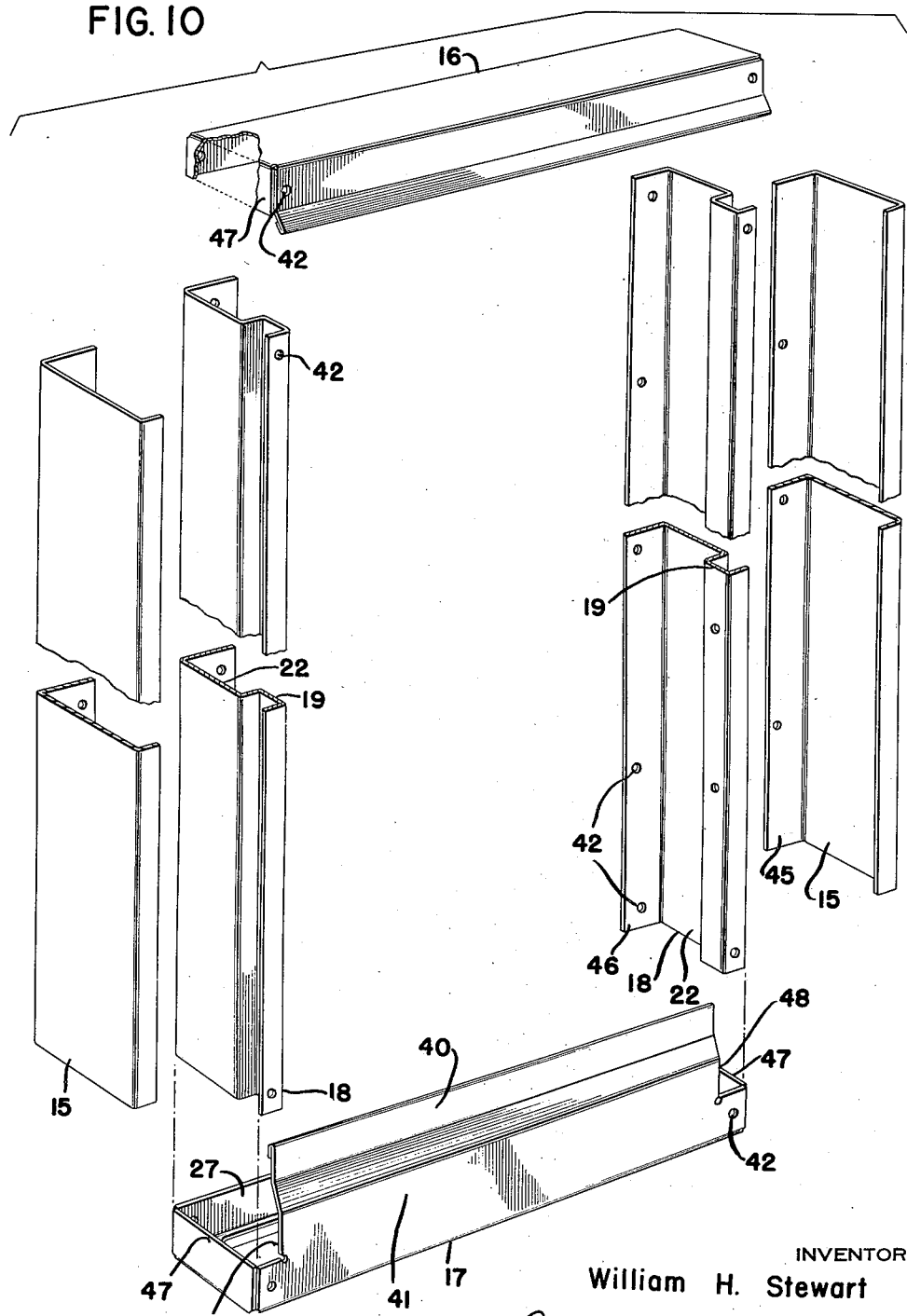

Patented Jan. 1, 1952

2,581,215

UNITED STATES PATENT OFFICE 2,581,215

OUTSIDE METAL BLIND

William H. Stewart, Oklahoma City, Okla.

Application March 25, 1949, Serial No. 83,469

3 Claims. (Cl. 189—62)

This invention relates to improvements in outside metal blinds, particularly to the frame and blind or louver structural features, while the operating mechanisms for opening and closing the louver or shutter elements disclosed, is the subject matter of a copending application for outside metal blinds and operating means therefor filed by Albert C. Fletcher on March 25, 1949, bearing the Serial No. 83,426.

An object of the invention is to provide a sturdy frame structure made in separable sections so that they can be assembled on the job; they are separated for safe shipment without danger of being marred. A further advantage of this feature is that the parts can be finished in different colors in separated relationship.

Another object of the invention is to provide a frame structure for outside blinds including side supporting elements of inverted channel construction providing a vertical pivotal mounting portion for the blind louver or shutter elements and a vertical casing for connecting links pivotally connected with the ends of the shutters for effecting an operation of the louvers or shutters in unison.

Another object of the invention is to provide separable side and upper and lower trim channel members in which the louver or shutter end mounting elements and operating members may have their peripheral edges encased when the members are assembled for use.

Another object of the invention is to provide separable frame elements which in assembly are secured by metal screws instead of requiring them to be welded out on the job.

Another object of the invention is to provide improved blind, shutter or louver elements wherein such elements are provided with troughs on their lower edges for drainage of condensate to the end of the louvers so that it will not flow over the outer surfaces of the next adjacent member below the trough thereby tending to keep the outer surfaces of the louvers as well as members of the frame clean.

Another object of the invention is to provide improved louver and frame structure which cooperate when closed to provide sealing cooperation between the louvers and frame structure as will be particularly pointed out.

Further objects and advantages will appear in the following description of a highly satisfactory embodiment of the outside metal blinds in accordance with my invention supplemented by the accompanying drawings illustrating the same and forming a part of this specification.

In the drawings:

Fig. 4 is an outside elevation view of the outside metal blinds in accordance with my invention.

Fig. 5 is a vertical sectional view similar to Fig. 2 but showing the louvers operated to open position.

Fig. 6 is a detail vertical sectional view taken on line 6—6 of Fig. 5.

Fig. 7 is a detail horizontal sectional view taken on line 7—7 of Fig. 4.

Fig. 8 is a detail vertical sectional view taken on line 8—8 of Fig. 5.

Fig. 9 is a detail horizontal sectional view taken on line 9—9 of Fig. 4.

Fig. 10 is an exploded perspective view of the frame structure showing the outer side thereof.

Figure 1:
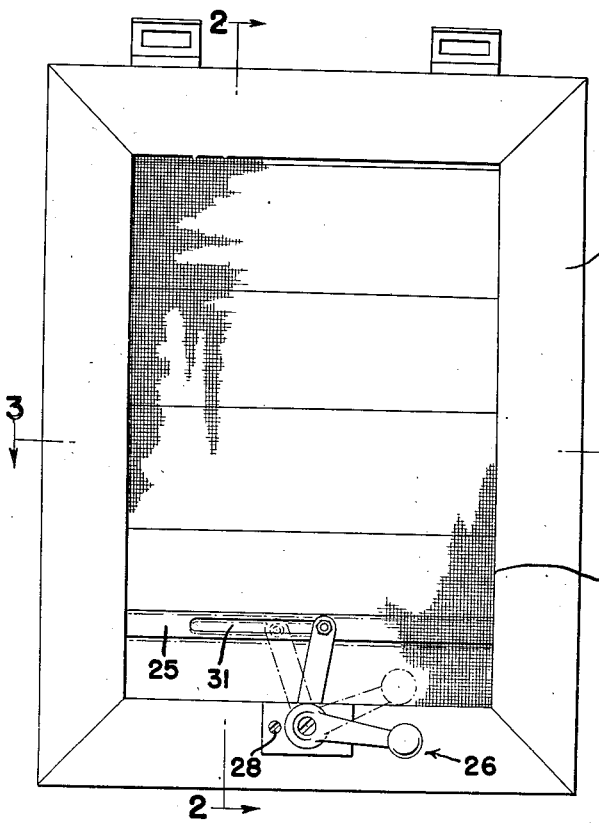
Fig. 1 is an inside elevation view of outside metal blinds in accordance with my invention.

In general the drawings illustrate shutter louvers 10, constituting blind or shutter elements, mounted in a metallic frame 11 secured to a wooden trim or screen frame 12 which may be supported by means of detachable hook members 13 in a window opening 14. A screen 12ª covers the inner side of metallic frame 11 and is secured in place on the outer surface of trim frame 12, between the abutting surfaces of the two frames. For purposes of illustration the shutter and frame organization is a small size, well adapted for vent windows of kitchens and the like showing the louvers and other parts on a larger scale than they would be if the window illustrated were larger, although the principles involved would be the same for such larger windows.

Metallic frame 11 includes outer side finishing channel members 15 and upper and lower end members 16 and 17, respectively within which side channels, inner louver mounting channel members 18 are housed. These channel members 18 each includes an inwardly projecting narrow channel 19 affording a mounting for pivot members 20 supporting end elements 21 of the louvers 10. To the inner side of channel 19 is an outwardly extending wider channel 22, the outer surface of which engages the inner surface of its respective side channel member 15. These channels 22 provide spaces for the operation of vertical links 23 therein, which are connected by pivots 24 with the end elements 21 of louvers 10 in corresponding positions of each end element offset from the pivots 20 at both ends of the louvers 10 so that the louvers may be opened or closed in unison by moving the links 23 down or up respectively in each of the channels 22.

The louver or shutter operating mechanism illustrated which is the subject matter of the Fletcher application referred to hereinbefore briefly comprises a cross bar 25 connected with links 23 and a crank operating assembly 26 mounted on the lower portion of screen frame 12 and extending through an inner flange 27 of lower end member 17 of frame 11, with bolts 28 maintaining the members in assembled relationship at this point. Between screen 12a and cross bar 25 the operating assembly is provided with a crank lever 29 having a pin 30 in its upper end engaging a slot 31 in cross bar 25 as fully described in said Fletcher application.

Figure 11:
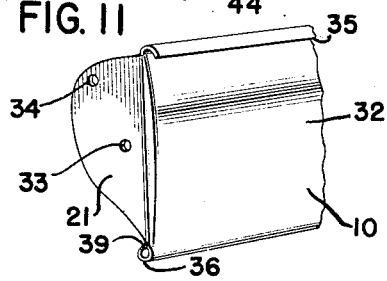
Fig. 11 is a fragmental perspective view of the end of one of the blind or shutter elements.

Referring particularly to the shutter or louver members 10 illustrated in Figs. 2, 3, 4, 5 and 11, it will be noted that the major portion of each louver element consists of a longitudinally concavo-convex inner and outer surface part 32 terminating in the end portions 21 extending inwardly at substantially right angles. These end portions 21, as shown in Fig. 11 are provided with apertures 33 and 34 for the respective pivot elements 20 and 24.

Figure 2:
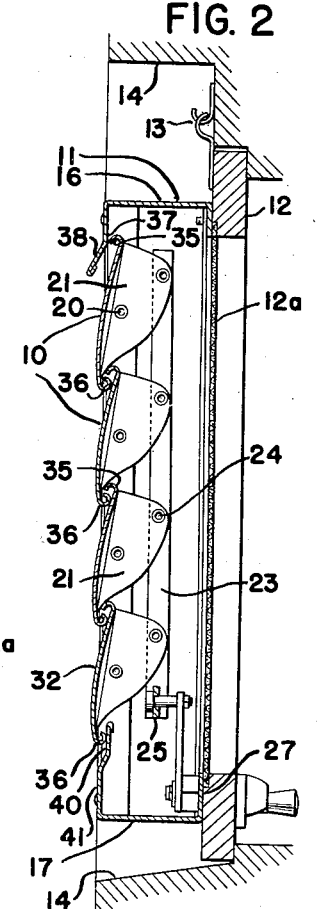
Fig. 2 is a vertical sectional view thereof taken on the line 2—2 of Fig. 1.

Louvers 10 are characterized by having upper and lower troughs 35 and 36 respectively formed on the longitudinal edges of the major portions 32 thereof. Trough 35 is well open and as shown in Fig. 2, the trough on the upper louver is substantially in engagement with an outer flange 37 of the upper end member 16 of frame 11 along a line where the lower portion 38 of the flange flares outwardly. The upper trough 35 of the succeeding lower louvers engages over the louver troughs 36 of the next adjacent louvers above them. Although lower troughs 36 appear to be substantially closed tubular elements on the lower edges of the louvers, actually they are open along their upwardly extending edges 39 thereby providing a trough member open by a narrow slot lengthwise of the louvers, so that moisture accumulating on the inner surface of the louvers will be conducted to the ends of the trough and drain from tapered orifices formed by angularly cut away beveled corners 40', best shown in Fig. 4. Thus moisture drops from the ends of trough 36 instead of dropping all along the outer surface of the lower louvers. The outwardly flaring portion 38 of the upper end member 16 of frame 11 likewise tends to protect the outer surfaces of the louvers. When the louvers 10 are in closed position, as best shown in Fig. 2 the lower trough 36 of the lowermost louver engages an inwardly off-set upper portion 40 of the upwardly extending outer flange 41 of the lower end member 17 which extends well above the inner flange 27 of this end member 17. Extending upwardly as it does it provides a screen below which parts of the lower operating mechanism is covered from exposure from the exterior as well as providing an abutment for the lower edge of the louver as just set forth. In accordance with this construction when the louvers are closed, the cooperation with the frame parts is such that the opening is substantially sealed by the louvers.

When in open position as shown in Fig. 5, operating parts for the louver are retracted to a position well below the upper edge offset portion 40 of flange 41 as just mentioned. The louvers are in a substantially horizontal position and as will be noted the louver upper troughs 35 are all directed upwardly thus providing troughs for any rain which might otherwise pass through the louvers except of course in case of a hard driving rain.

Metallic frame 11 as stated includes the finishing channel members 15 and end members 16 and 17 which house mounting channel members 18 upon which the louvers 10 are pivotally mounted on the narrow inwardly extending channels 19 while the wider outwardly extending channels 22 provide spaces for the vertical links 23 connecting the louvers at each end. An important feature of the construction is the provision whereby the louvers and links 23 are assembled and mounted in these channel pieces 18 each including a channel 19 and a channel 22 as an assembled unit, onto which the finishing channels 15 and end members 16 and 17 may afterwards be assembled, at the time of installation on a job for example.

Figure 3:
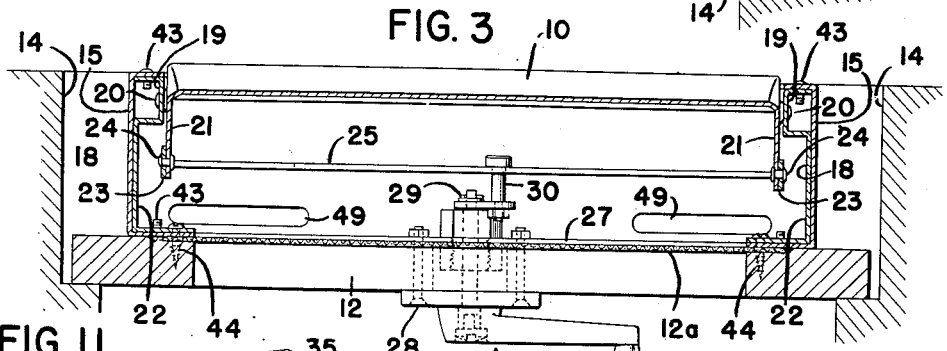
Fig. 3 is a transverse sectional view thereof taken on line 3—3 of Fig. 1.

The construction of these various frame elements is best illustrated in the exploded perspective view, wherein the elements are illustrated with drill holes 42 for receiving metal screws 43 preferably of the self threading type at the corners only for assembling the finishing side channels 16 on the ends of the louver and channel assembly as illustrated for example in Figs. 7 and 9 and fastening the structure to the screen frame 12 and incidentally securing the screen 12a in place as best shown in Fig. 3 by wood screws 44. To facilitate securing the metal frame 11 to the wooden screen frame 12 the inner flanges 45 of finishing side channels 15 and corresponding flanges 46 of the channel members 18 are wider than the outer flanges of these members providing access to the holes 42 for wood screws 44 which are positioned nearer the edges in the intermediate portions thereof than the end holes 42 for the metal assembly screws 43.

The upper and lower end members 16 and 17 each have end extensions 47 of the length equal to the height of the inner flanges thereof bent to engage and cooperate with the inner and outer flange members and to cover portions of the channel members 18. These end members are assembled on channels 18 by means of the two metal screws 43 at each corner. Finishing channels 15 are shorter than channel members 18, being of such a length as to cover the exposed portions of channel members 18 between the extensions 47 of the upper and lower end members 16 and 17 and are secured in place by the wood screws 44 which fasten the metal frame structure 11 to the wooden screen frame 12. The flange 41 and its offset portion 40 of lower end member 17 are cut away at their ends as shown at 48 so that the portions thereof above the lower ends of finishing side channels 15 will extend between the flanges thereof and inwardly as required by the inwardly offset portion 40.

As shown in Figs. 3 and 9, the bottom portion of lower end member 17 is provided with a pair of openings 49 preferably one adjacent to each end, for draining any moisture or dust which may accumulate therein.

In the arrangement of the frame as above set forth it is to be noted that the frame finishing parts, side channels 15 and upper and lower end members 16 and 17 are separate elements which may be finished in a distinct manner, as a different color, with respect to the assembled louvers 10 and mounting channel pieces 18 comprising an assembled unit. These pieces can be packed separately for shipment so that the various parts are better protected from damage. On the job they may readily be assembled on the screen frame 12 and screen 12ª which may be secured in place on the screen frame by means of tacks or the like in the usual manner, or clamped in place between the metal frame 11 and screen frame 12 when the frame is secured by means of the wood screws 44 to the screen frame 12 and then parts of the louver operating mechanism extending through the screen frame are secured in position. Such means assembling and fastening the parts in place is preferable, in view of the above, to welding the finishing parts of the frame to the lower assembly unit.

I claim:

1. An outside metal blind comprising, a metal frame having louver mounting vertical side members, a series of vertically spaced horizontally extending louvers between said side members, lateral end pieces on the ends of said louvers, a pivotal connection between each of said end pieces and the corresponding side member, connecting links pivotally connected with the said end pieces so that the louvers may be opened or closed in unison, each louver characterized by having an outwardly projecting inverted trough on its upper edge and an upwardly projecting lower trough opening upwardly to receive condensate from the inner side of the louver element, said upper trough adapted to extend over the lower trough of the louver next above it when the louvers are in closed position, an upper end member on the upper ends of said louver supporting side members having an outer flange with a downwardly and outwardly flaring lower portion deflecting moisture outwardly from the upper portion of the frame and against the inner side of which the outer side of the upper trough and the upper louver engages when the louvers are in closed position, a lower end member on the lower ends of said louver supporting side members having an outer flange with an upwardly and inwardly extending offset portion against the outer side of which the inner side of the lower trough of the lower louver engages when the louvers are in closed position, said upper and lower end members having end extensions bent to engage the outer sides of the vertical side members, and outer finishing side channels extending over the outer sides of said vertical side members between said upper and lower end members and the ends of the bent extensions thereof.

2. In an outside blind a metallic frame structure including vertical side members each formed with a pair of channels, one projecting inwardly and the other outwardly to provide mountings for louvers and housings for louver connecting links, upper and lower end members of channel formation secured to the upper ends of said vertical side members, said upper and lower end members having end extensions bent to engage the outer sides of the vertical side members, and outer finishing side channels extending over the outer sides of said vertical side members between said upper and lower end members and the ends of the bent extensions thereof.

3. In an outside metal blind organization including, a rectangular metallic frame comprising side channel members wherein an outer inwardly projecting channel and an inner outwardly extending channel provide shutter mounting members and casings for shutter operating links, a closure channel connected with the upper ends of said side channel members, and a closure channel connected with the lower ends of said side channel members with the outer flange extending upwardly over the ends of the side channel members to a greater extent than the inner flange; a plurality of laterally extending shutters pivotally mounted at equal intervals on the inwardly extending channels of the side members so as to swing from substantially horizontal open positions to substantially vertically downward closed positions with the lower edges of the shutters overlapping the upper edge of the next adjacent lower shutter and the lower edge of the lowermost shutter overlapping the upper edge of the outer flange of the closure channel connected with lower ends of the side channel members; operating means for opening and closing the shutter elements comprising a vertical link in each of the outwardly extending channels of the side members pivotally connected with ends of the shutter elements at corresponding spaced positions spaced from the pivotal mountings of the shutter elements for effecting a uniform operation of the shutter elements in opening and closing of the shutters, and means for operating said links for opening and closing of the shutters.

WILLIAM H. STEWART.

REFERENCES CITED

The following references are of record in the file of this patent:

UNITED STATES PATENTS

| Number | Name | Date |
| --- | --- | --- |
| Re. 17,277 | Messenger | Apr. 23, 1929 |
| 2,220,405 | Jones | Nov. 5, 1940 |
| 2,233,315 | Jones | Feb. 25, 1941 |
| 2,244,012 | Johnson | June 3, 1941 |
| 2,359,289 | Brown | Oct. 3, 1944 |